Jan. 19, 1965   A. RODGERS, JR., ET AL   3,165,754
SIDE SHIELD MOUNTING FOR SPECTACLES
Filed March 27, 1961

ALFRED RODGERS, JR.
R.F.E. STEGEMAN
*INVENTORS*

BY Frank C. Parker

*ATTORNEY*

3,165,754
SIDE SHIELD MOUNTING FOR SPECTACLES
Alfred Rodgers, Jr., Rochester, and Raymond F. E. Stegeman, Greece, N.Y., assignors to Bausch & Lomb Incorporated, Rochester, N.Y., a corporation of New York
Filed Mar. 27, 1961, Ser. No. 98,608
1 Claim. (Cl. 2—13)

This invention relates generally to protective spectacles and more particularly it relates to improvements in means for attaching side shields demountably thereto.

It is an object of this invention to provide novel means for demountably attaching a side shield to a pair of spectacles or goggles, said means being simple and strong in structure while being effective and reliable in operation.

It is a further object to provide such a device which is adaptable to various sizes of spectacles, which utilizes unitized molded construction as much as possible and requires the minimum of change in standard spectacle construction whereby a minimum cost is achieved and good appearance is enhanced.

Figure 1:
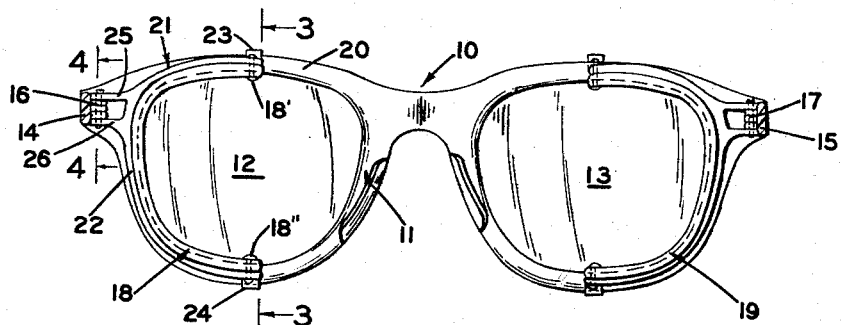
Figure 2:
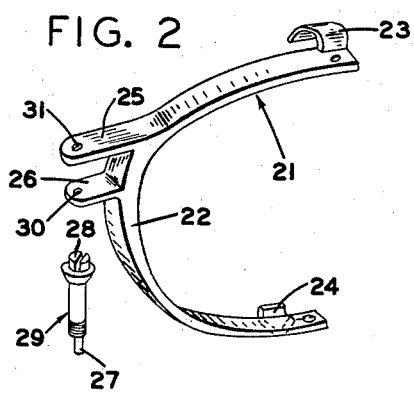
Figure 3:
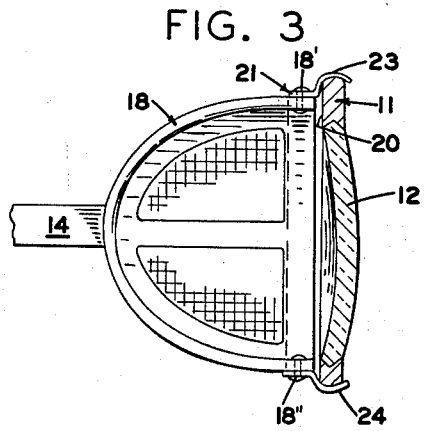
Figure 5:
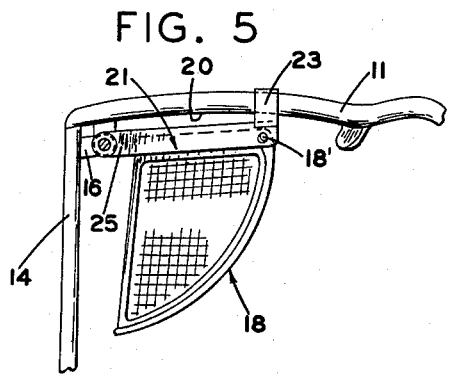
Figure 4:
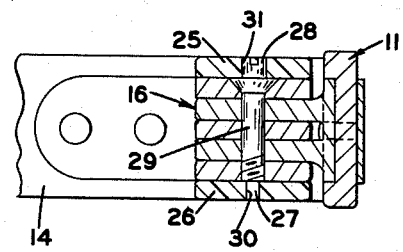

Further objects and advantages will be found in the details of construction and arrangement of the parts of this invention by reference to the specification herebelow and the accompanying drawing in which:

FIG. 1 is a rear elevational view of a pair of spectacles or goggles having protective side shield structure according to the present invention, FIG. 2 is a perspective view of certain of the individual parts of the invention, FIG. 3 is a cross sectional view taken on the line 3—3 of FIG. 1, FIG. 4 is a cross sectional view taken on the line 4—4 of FIG. 1, and FIG. 5 is a top view of a pair of protective spectacles having the novel side shield supporting structure assembled thereon.

A preferred form of the present invention is shown in the drawings as used on a pair of protective spectacles generally designated by the numeral 10. The spectacles or goggles may be of any desired type having a frame 11 wherein lenses 12 and 13 are mounted, said frame being held on the wearer by a pair of temples 14 and 15 which are pivotally mounted by the respective temple hinges 16 and 17 on the frame. A pair of protective side shields 18 and 19 of any preferred design are mounted adjacent to the rear face 20 of the frame 11 in such a position as to ward off flying particles.

According to this invention, means are provided for detachably mounting the side shields 18 and 19 in operative position on the frame 11, said means including a support member 21 whereon each side shield is secured in any preferred manner such as the rivets 18' and 18". The support member 21 basically is preferably formed as a slender body 22 from a suitable plastic molded material which is resilient and tough. Said body 22 is approximately semicircular or arcuate in shape and extends from the top of the frame 11 around the temporal side and bottom portions thereof. At the top and bottom ends of member 21 are integrally formed two opposite attachment hooks 23 and 24 which are formed laterally thereof so as to grasp the edge of the frame 11 to hold the mounting member on the frame. To assure a firm grasp on the frame, the mounting member 21 is molded with such a body curvature that the integral hooks are initially located somewhat closer together than when assembled on the frame. The top and bottom ends of the resilient member 21 are spread apart during assembly so that the hooks 23 and 24 engage the edge of the frame 11 with retentive force.

Further comprised in said mounting means is a pair of integrally molded sidewardly extending support arms 25 and 26 which are formed on the temporal portion of the mounting member 21. The two support arms 25 and 26 extend into contact with the top and bottom surfaces respectively of a temple hinge 16 covering an area including the hinge pin therein. In assembled position, the arms are substantially parallel to each other but as molded, the arms may be inclined toward each other if necessary so as to resiliently clasp the hinge 16 therebetween when the arms are spread apart and placed on the opposite ends of the hinge as shown in FIG. 2.

Connecting means are provided between the ends of the arms 25 and 26 and the temple hinge 16 to retain the arms thereon comprising elongations 27 and 28 formed on the hinge screw 29 so as to project exteriorly of the hinge. These elongations 27 and 28 are constructed to fit into a corresponding pair of openings 30 and 31 formed in the ends of the support arms 25 and 26 and provide a quick detachable connection between said arms and the hinge.

In the foregoing description, it is pointed out that the mounting member 21 is a unitary molded member the various parts thereof, such as the hooks 23 and 24 and the arms 25 and 26 as well as the body 22 being mildly resilient and deformable so that forces may be induced therein which maintain the associated side shield in correct assembled position and permit easy demountability thereof without the use of tools.

It is further pointed out that the above described structure consists of a minimum of separate parts for utmost simplicity and low cost, and although a preferred form only of this invention has been shown and described in detail, changes may be made in the form and arrangement of the parts and the details of construction without departing from the spirit of this invention as defined in the claim here appended.

We claim:

A quick detachable support member for a side shield, said member being characterized by the combination of a spectacle frame and
 a pair of resilient extensions which embrace and extend continuously around the temporal, upper and lower portions of said spectacle frame,
 a temple hinge forming a part of said frame and having a top and a bottom surface thereon,
 means for securing the support member in operative position on said frame, said means comprising a pair of resilient arms formed on the temporal portion of said member and projecting substantially unidirectionally outwardly therefrom, said arms being spaced apart by a distance substantially equal to the distance between the top and bottom surfaces whereon the arms bear,
 a hinge screw in said hinge,
 an axially directed extension formed on each end of said screw and projecting beyond said hinge, the extensions being fitted into and retained by corresponding openings formed in the outer ends of said arms, one of said extensions being slotted transversely to form a screw head, whereby flexure of the arms away from each other permits each extension to be inserted into its respective opening.

References Cited in the file of this patent

UNITED STATES PATENTS

| | | |
|---|---|---|
| 422,001 | Wilson | Feb. 25, 1890 |
| 623,975 | Bennum | May 2, 1899 |
| 1,738,618 | Shindel | Dec. 10, 1929 |
| 2,684,014 | Fairley | July 20, 1954 |
| 2,840,821 | Gay et al. | July 1, 1958 |

FOREIGN PATENTS

| | | |
|---|---|---|
| 1,014,634 | France | June 18, 1952 |
| 1,037,166 | France | Apr. 29, 1953 |